Figure 1:
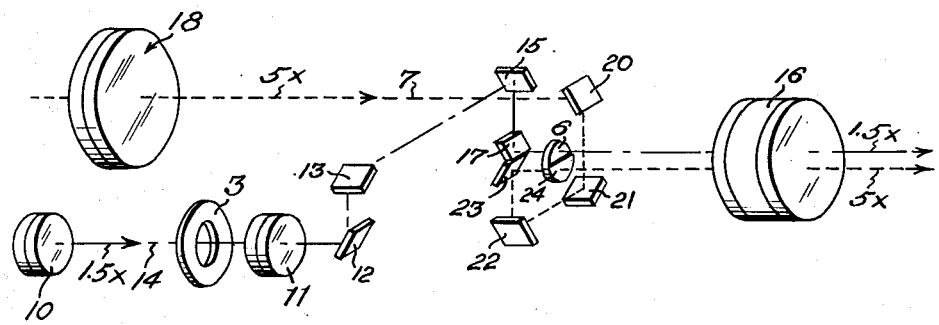

Oct. 31, 1950    J. L. GREENSTEIN ET AL    2,527,719
DUAL POWER SPLIT-FIELD ANTITANK TELESCOPE
Filed Nov. 28, 1947    2 Sheets-Sheet 1

Inventors
Jesse L. Greenstein
Louis G. Henyey

By J. N. Church, W. E. Thibodean & A. W. Dew
Attorneys

Oct. 31, 1950     J. L. GREENSTEIN ET AL     2,527,719
DUAL POWER SPLIT-FIELD ANTITANK TELESCOPE
Filed Nov. 28, 1947                                      2 Sheets—Sheet 2

Inventors,
Jesse L. Greenstein
Louis G. Henyey

By J. H. Church, W. E. Thibodeau & A. W. Dew
Attorneys

Patented Oct. 31, 1950

2,527,719

UNITED STATES PATENT OFFICE 2,527,719

DUAL POWER SPLIT-FIELD ANTITANK TELESCOPE

Jesse L. Greenstein, Williams Bay, Wis., and Louis G. Henyey, Berkeley, Calif., assignors to the United States of America as represented by the Secretary of War Application November 28, 1947, Serial No. 788,614

1 Claim. (Cl. 88—32)

This invention relates to split-field dual-power telescopes intended more particularly for use on combat tank destroyers. As is well known, such vehicles depend to a large extent on fire power and speed. At the same time accurate aiming of the large caliber gun or guns carried by the vehicle is of particular importance because of the limited amount of ammunition which can be carried at any one time. Furthermore, the unusual shocks and jars engendered by traveling at relatively high speeds over rough terrain, plus the necessary protection of the destroyer personnel from small arms fire, introduce special requirements in any sight suitable for use on such vehicles.

It is accordingly the general purpose of this invention to provide a dual power telescope of the split field type which will satisfy the requirements mentioned.

More specifically, the important objects are:

1. To provide a telescope as aforesaid with large exit pupil and eye relief as a protection to the gunner while the vehicle is traveling over rough terrain and to enable him to effectively view the target over an appreciable range of movement of his head transversely of the eyepiece.

2. To provide a telescope in which the eye is provided with two magnifications separated by a diameter of one and the same exit pupil, as for example, a 1.5X magnification in the upper half of the pupil, and a 5X magnification in the lower half of said pupil.

3. To provide a telescope as aforesaid which may employ lenses of plastic, except for one glass lens and in which an all-glass modification may be made with no major changes in construction.

4. To provide a telescope of the nature stated having a mirror-erecting system of special construction which replaces the conventional Porro and lens erecting systems.

5. To provide a dual-power, split-field telescope which is relatively simple to build, capable of withstanding the rough usage to which instruments in tank combat are inevitably subject, and which will provide, with a minimum of movement of the observer's eye, a first field of view covering a relatively wide area, for general inspection, and a second field of view providing magnification of a central portion of the first field, for closer inspection of, and aiming at, a selected target.

Other objects and advantages of the invention will become apparent after a study of the following disclosure.

Figure 3:
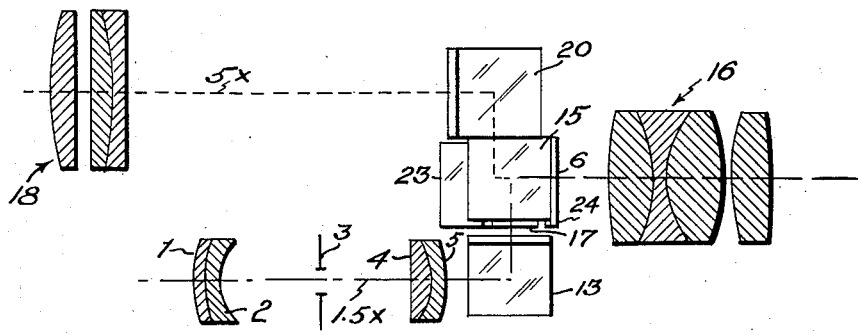
Figure 2:
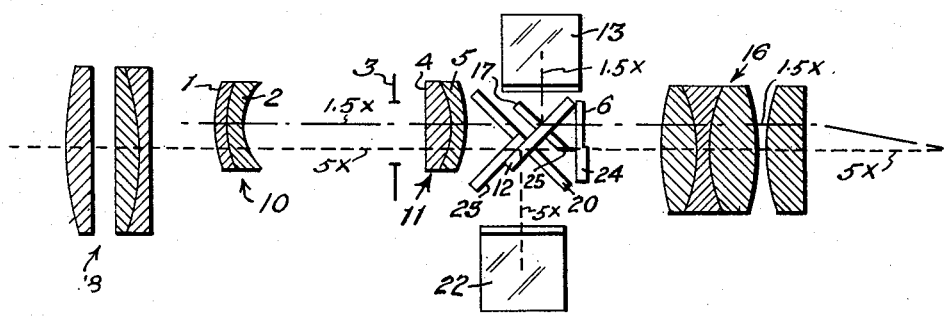
Figure 4:
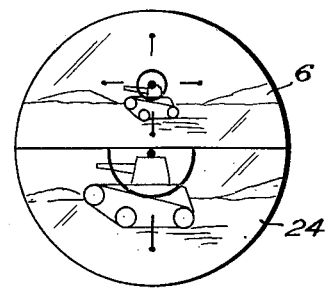
Figure 5:
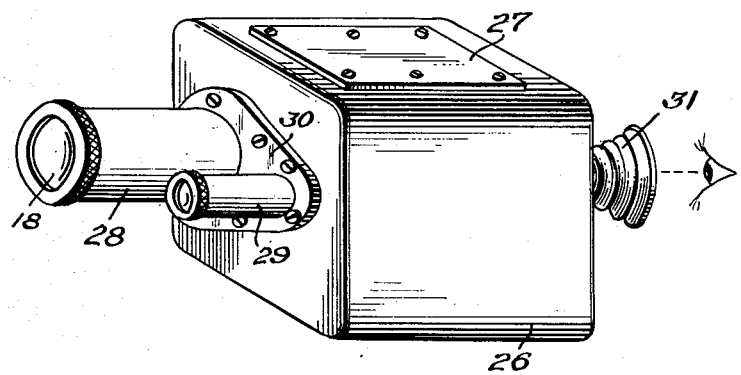

In the drawing:

Fig. 1 is a schematic perspective view showing the general arrangement and relation of the optical parts, the reflectors being reduced in size for clearness of illustration, Fig. 2 is an elevational view showing the general relations and dimensions of one model of the telescope, all lenses being shown in section, Fig. 3 is a plan view corresponding to Fig. 2, Fig. 4 is a view of the exit pupil showing a typical view of a target as seen by the gunner, and Fig. 5 is a perspective view showing the general external appearance of the instrument.

Describing first the lower power side of the instrument, 1.5X in the model described, the objective comprises an inverted telephoto lens which may be constructed of glass or plastic. The forward element 10 of this objective comprises a concavo-convex cemented doublet comprising component lenses 1 and 2. The necessary data of the lenses of the low power unit are given in Tables I and II, infra. This element is followed by a diaphragm 3 and a second or rear plano-convex cemented doublet 11 comprising lenses 4 and 5.

Following element 11, a mirror 12 is positioned at 45° across the optical axis 14 to reflect the rays upwardly to a second mirror 13 positioned parallel to the axis 14. From mirror 13, the rays are reflected horizontally inwardly to mirror 15. This mirror, as will be noted from Figs. 1 and 3, is symmetrical with respect to a vertical plane through the principal axis of eyepiece 16. From mirror 15, the rays are reflected downwardly to a mirror 17 which, as will be noted from Fig. 2, is essentially a half mirror having a lower beveled edge in the common horizontal plane through the optical axes of eyepiece 16 and the objective 18 of the higher power or 5X side of the instrument. Mirrors 12, 13, 15 and 17 constitute a set.

Since it is desirable to maintain the high-power or 5X objective horizontally coplanar with the single eyepiece 16, the objective 10, 11 of the lower power, or 1.5X side, is positioned, as shown upon Fig. 2, with its principal axis in a horizontal plane above the corresponding plane of the axis of objective 18. This vertical separation, in the model shown, is 0.55" so that the principal axis of the 1.5X objective 10, 11, pierces its reticle 0.55" above the axes of the eyepiece.

An on-axis object (mechanically, and in the 5X field) would appear at half-field upwardly on the 1.5X side in the absence of a collective lens. Furthermore, since the entrance pupil of the 1.5X side is 0.55" above the axis of eyepiece 16, and also lies closer to the eyepiece in the axial direction, than the entrance pupil of the 5X side, the 1.5X exit pupil would be displaced about 0.1" below and 0.8" to the right of that of the 5X side. Thus the observer would have to move his eye a substantial distance in shifting from one field to the other.

To eliminate this movement, the reticle 6 is formed as an eccentric collective lens. This lens is semicircular, with its diameter horizontal. In the model shown the lens is cut from a planoconvex lens of DBC-1, and has a radius of −12.5" and thickness of 0.22". The original lens is 1.598" in radius and is cut along a chord 1.11" from its center. This chord forms the diameter of the finished lens, which then has a radius of 1.15". The center of the original lens is then 0.04" below the top of the finished lens.

Alternatively, lens 6 may be constructed of plastic such as styrene. In the latter case, the radius of the original lens may be 1.621" and the chordal cut made 1.14" from its true center. The radius of curvature may be −12.7". All other dimensions are the same as for the glass lens.

This lens 6 acts in a well-known manner to image the exit pupil forward and, by prismatic action, to shift it upwardly. As a result, the two entrance pupils are made coincident and since both objectives are fully used, the pupils are circular. The reticle is, of course, in or on the flat forward face of the collective. From lens 6 the rays proceed through eyepiece 16, shown as a conventional orthoscopic element.

In the model selected for illustration, the principal axes of the objectives have a horizontal separation of 4.66" as well as the aforesaid vertical separation of 0.55". The objective 18 on the 5X side is a triplet of standard construction, the rays from which are reflected vertically downward by a mirror 20, to a second mirror 21, thence laterally inwardly to a third mirror 22. From mirror 22, the rays are projected upwardly to mirror 23 which, as will be noted from Fig. 2, extends at 45° to the principal axis of eyepiece 16 and has its upper edge positioned a little above said axis and in slightly overlapping relation with the lower edge of mirror 17 in a plane transversely of the optical axes. Mirror 23 projects the rays from mirror 22, rearwardly along the axis of eyepiece 16. Mirrors 20, 21, 22 and 23 constitute a second set.

A semicircular reticle element 24 consists of a transparent pane of glass or plastic of uniform thickness, having its forward surface coplanar with that of lens 6. The common plane of these surfaces, of course, lies at the focus of eyepiece 16. A baffle 25, not shown in Fig. 1, but appearing in Fig. 2, consists of a thin flat opaque sheet extending from the lower edge of mirror 17 to the horizontal diametrical line of separation between reticle elements 6 and 24. This baffle acts to completely separate the two images at the focus so that no ray from the 1.5X objective can reach the half of the reticle of the 5X objective. In addition to the properties previously mentioned, the 5X side of the model illustrated, has an exit pupil of 0.8" a true field diameter of 6° and an apparent field of 30°. The eye relief is 4".

It will thus be seen that we have provided a dual-power, split-field telescope of rugged construction and versatile use. Looking upwards, the user has available a 1.5X field covering a relatively wide field whereby he may generally inspect the field, and accurately size up the tactical situation. Having selected a target, he may glance downwardly and view the selected target at 5X magnification to thereby accurately lay his gun and effectively engage the target with a minimum number of shots. As illustrated in Figure 4, in the 5X field an on-axis object appears at the center of the apparent field while the same object appears in the 1.5X field at a point midway between the top and center of the apparent field. No movement of the observer's head is required to shift from one field to the other.

The apparent field diameter is about 30°. Consequently, the true fields are:

1.5X side—20° from right to left along the dividing diameter, 10° from top to bottom along the top vertical radius.

5X side—6° from right to left along the dividing diameter, 3° from top to bottom along the bottom vertical radius.

For greater clarity of illustration, the mirrors are shown in Fig. 1 greatly reduced in size. They are shown on Figs. 2 and 3 in approximately correct scale relation. The first three mirrors of each set, in the model shown, are about 2.1" x 2.8", while the fourth and last mirrors of each set are about 2.1" x 1.6".

The sight is mounted in a box 26, 20" long and 9" square, having a top cover plate 27. The 5X objective 18 may be mounted in a tube 28 while the elements 10 and 11 of the 1.5X objective may be mounted in a tube 29 projecting a few inches forwardly from box 26. Both tubes may conveniently be fixed in a plate 30 secured over an aperture in the front wall of the box 26. The eyepiece 16, is fixed in the rear wall of box 26 and projects centrally therethrough. A rubber eye cup 31 is provided to afford protection to the observer.

The following two tables give pertinent data for two telephoto lenses suitable for use in the model selected for disclosure:

TABLE 1

*Inverted telephoto lens—glass*

EFL—5.99"; BFL—8.28"

[All dimensions in inches]

| Element | Radii | | Thickness | Separation | Glass | Aperture |
|---|---|---|---|---|---|---|
| 1 | +3.72 | +8.17 | 0.20 | Cemented 4.20 | EDF-1 | 1.9 |
| 2 | +8.17 | +2.12 | 0.20 | | BSC-2 | |
| 3 | | | | | Diaphragm | 1.55 |
| 4 | +36.3 | −1.452 | 0.52 | 0.89 Cemented | C-2 | 1.9 |
| 5 | −1.452 | −2.55 | 0.20 | 8.28 Air to focus | EDF-1 | |

TABLE 2

*Inverted telephoto lens—plastic*

EFL—5.98″; BFL—8.13″

[All dimensions in inches]

| Element | Radii | | Thickness | Separation | Glass | Aperture |
|---|---|---|---|---|---|---|
| 1 | +4.86 | +24.3 | 0.21 | 0.01 | EDF-1 | 2.1 |
| 2 | +9.06 | +2.04 | 0.21 | 3.82 | CHM-Methacrylate | |
| 3 | | | | 1.07 | Diaphragm | 1.52 |
| 4 | +19.11 | −1.453 | 0.625 | Cemented | CHM-Methacrylate | 2.1 |
| 5 | −1.453 | −2.81 | 0.21 | 8.13 Air to focus | Styrene- | |

While we have described the instrument on the assumption that axes 14 and 7 are horizontal and substantially horizontally displaced, it will be realized that this is for convenience and clarity of illustration only, and that the instrument may be designed for use with the said axes spaced vertically or in a plane having any desired angular relation to the vertical. Furthermore, various modifications and substitutions will readily occur to those skilled in the art after a study of the present disclosure. For example, prisms may be substituted for mirrors 12, 13, 15, 17 and 20 to 23, inclusive. Other absolute values and ratios of magnification may be used, when desired.

For this reason we do not wish to be limited to the precise details of construction shown and there is no intention to limit the invention to the particular embodiment herein shown. To the contrary, it is intended to cover all modifications and alternative constructions falling within the spirit and scope of the invention as expressed in the subjoined claim.

In the claim, the term "axis" as used in connection with any lens, means the principal axis of the same.

Having now fully disclosed the invention, what we claim and desire to secure by Letters Patent is:

In a split-field dual-power telescope, an eyepiece having a horizontal axis, first and second objectives of different focal lengths mounted in horizontally spaced relation on opposite sides respectively, of a vertical plane through said axis, the axes of said objectives being parallel, a first mirror positioned at 45° on and across the axis of said first objective to reflect the rays incident thereon vertically upwardly, second and third mirrors positioned to successively reflect the rays from said first mirror horizontally inwardly to said vertical plane, thence downwardly substantially in said plane, a fourth mirror positioned to receive rays from said third mirror and to reflect the same rearwardly slightly above and parallel with the axis of said eyepiece, a fifth mirror positioned at 45° on and across the axis of said second objective to reflect the rays incident thereon vertically downwardly, sixth and seventh mirrors positioned to successively reflect the rays from said fifth mirror horizontally to said vertical plane, thence upwardly to the axis of said eyepiece, an eighth mirror positioned across said axis to receive rays from said seventh mirror and to reflect the same rearwardly along said axis to said eyepiece, and a semi-circular eccentric collective lens between said fourth mirror and said eyepiece to focus the entrance pupil of said first objective onto the exit pupil of said second objective and eyepiece, the axis of said lens coinciding with the axis of said eyepiece.

JESSE L. GREENSTEIN.
LOUIS G. HENYEY.

REFERENCES CITED

The following references are of record in the file of this patent:

UNITED STATES PATENTS

| Number | Name | Date |
|---|---|---|
| 409,981 | Krogmann | Aug. 27, 1889 |
| 578,459 | Leuner | Mar. 9, 1897 |
| 828,511 | Saegmuller | Aug. 14, 1906 |
| 741,262 | Martin | Jan. 15, 1907 |
| 880,028 | Konig | Feb. 25, 1908 |
| 959,179 | Swasey | May 24, 1910 |
| 1,290,777 | O'Brien | Jan. 7, 1919 |
| 1,873,302 | De Francisco | Aug. 23, 1932 |
| 1,921,630 | Mechan | Aug. 8, 1933 |
| 2,388,673 | Brown | Nov. 13, 1945 |
| 3,409,186 | Bouwers | Oct. 15, 1946 |

FOREIGN PATENTS

| Number | Country | Date |
|---|---|---|
| 15,123 | Great Britain | of 1911 |
| 1,727 | Great Britain | of 1915 |
| 555,863 | Germany | Aug. 3, 1932 |